US012393139B2

(12) United States Patent
Kawasaki et al.

(10) Patent No.: US 12,393,139 B2
(45) Date of Patent: Aug. 19, 2025

(54) BELT CONVEYING DEVICE AND IMAGE FORMING APPARATUS

(71) Applicant: KYOCERA Document Solutions Inc., Osaka (JP)

(72) Inventors: Kenichiro Kawasaki, Osaka (JP); Kazuhisa Hirahara, Osaka (JP); Takashi Kainuma, Osaka (JP)

(73) Assignee: KYOCERA Document Solutions Inc., Osaka (JP)

( * ) Notice: Subject to any disclaimer, the term of this patent is extended or adjusted under 35 U.S.C. 154(b) by 0 days.

(21) Appl. No.: 18/599,925

(22) Filed: Mar. 8, 2024

(65) Prior Publication Data

US 2024/0310758 A1 Sep. 19, 2024

(30) Foreign Application Priority Data

Mar. 15, 2023 (JP) ................................. 2023-040502

(51) Int. Cl.
*G03G 15/16* (2006.01)

(52) U.S. Cl.
CPC ....... *G03G 15/161* (2013.01); *G03G 15/1615* (2013.01)

(58) Field of Classification Search
CPC ......................... G03G 15/161; G03G 15/1615
See application file for complete search history.

(56) References Cited

U.S. PATENT DOCUMENTS

2019/0302654 A1 10/2019 Ichihashi ............. G03G 15/161
2021/0389698 A1* 12/2021 Miyake .................. G03G 15/01
2022/0019159 A1* 1/2022 Kainuma ............. G03G 15/161

FOREIGN PATENT DOCUMENTS

JP 2019-184996 A 10/2019

* cited by examiner

*Primary Examiner* — Stephanie E Bloss
*Assistant Examiner* — Michael A Harrison
(74) *Attorney, Agent, or Firm* — Stein IP, LLC

(57) ABSTRACT

A belt conveying device includes a correction mechanism, a belt cleaning unit, a roller retaining member, a cleaning support member, and a posture maintaining unit. When a belt is meandering, the correction mechanism allows one end side of a meandering correction roller in an axial direction to move in the direction perpendicular to the axial direction, so as to correct meandering of the belt. The posture maintaining unit connects the roller retaining member and the cleaning support member, so as to maintain posture of the belt cleaning unit with respect to the meandering correction roller.

4 Claims, 5 Drawing Sheets

BELT CONVEYING DEVICE AND IMAGE FORMING APPARATUS

INCORPORATION BY REFERENCE

This application is based upon and claims the benefit of priority from the corresponding Japanese Patent Application No. 2023-040502 filed Mar. 15, 2023, the entire contents of which are hereby incorporated by reference.

BACKGROUND

The present disclosure relates to a belt conveying device and an image forming apparatus.

As a component of an image forming apparatus such as a copier or a printer, there is known a belt conveying device including an endless belt, such as an intermediate transfer belt on which a plurality of toner images having different colors formed by photosensitive drums are sequentially overlaid as primary transfer, and from which the toner images are secondarily transferred onto a paper sheet, or a conveyor belt that absorbs and conveys the paper sheet. The belt conveying device has a problem that the belt may be shifted in an axial direction of a roller around which the belt is wrapped in a rotatable manner, and hence the belt may be meandering.

To solve this problem, a technique to stop the meandering of the belt by adjusting alignment of the roller is proposed. However, when the alignment of the roller is adjusted, a contact angle between the belt and a cleaning blade for cleaning an outer circumferential surface of the belt is changed, and cleaning performance of the belt becomes unstable.

SUMMARY

A belt conveying device according to one aspect of the present disclosure includes an endless belt, a plurality of rollers, a correction mechanism, and a belt cleaning unit. The belt is wrapped around the plurality of rollers in a rotatable manner. The correction mechanism corrects meandering of the belt with respect to the roller. The belt cleaning unit removes attached matter on an outer circumferential surface of the belt. The correction mechanism is provided to a meandering correction roller that is one of the plurality of rollers, and includes a moving mechanism that allows one end side of the meandering correction roller in an axial direction to move in a direction perpendicular to the axial direction when the belt is meandering. Further, the belt conveying device includes a roller retaining member, a cleaning support member, and a posture maintaining unit. The roller retaining member retains a shaft of the meandering correction roller. The cleaning support member is attached to the shaft of the meandering correction roller so as to support the belt cleaning unit. The posture maintaining unit connects the roller retaining member and the cleaning support member, so as to maintain a posture of the belt cleaning unit with respect to the meandering correction roller.

DETAILED DESCRIPTION

Hereinafter, an embodiment of the present disclosure is described with reference to the drawings. Note that the present disclosure is not limited to the following description.

Figure 1:
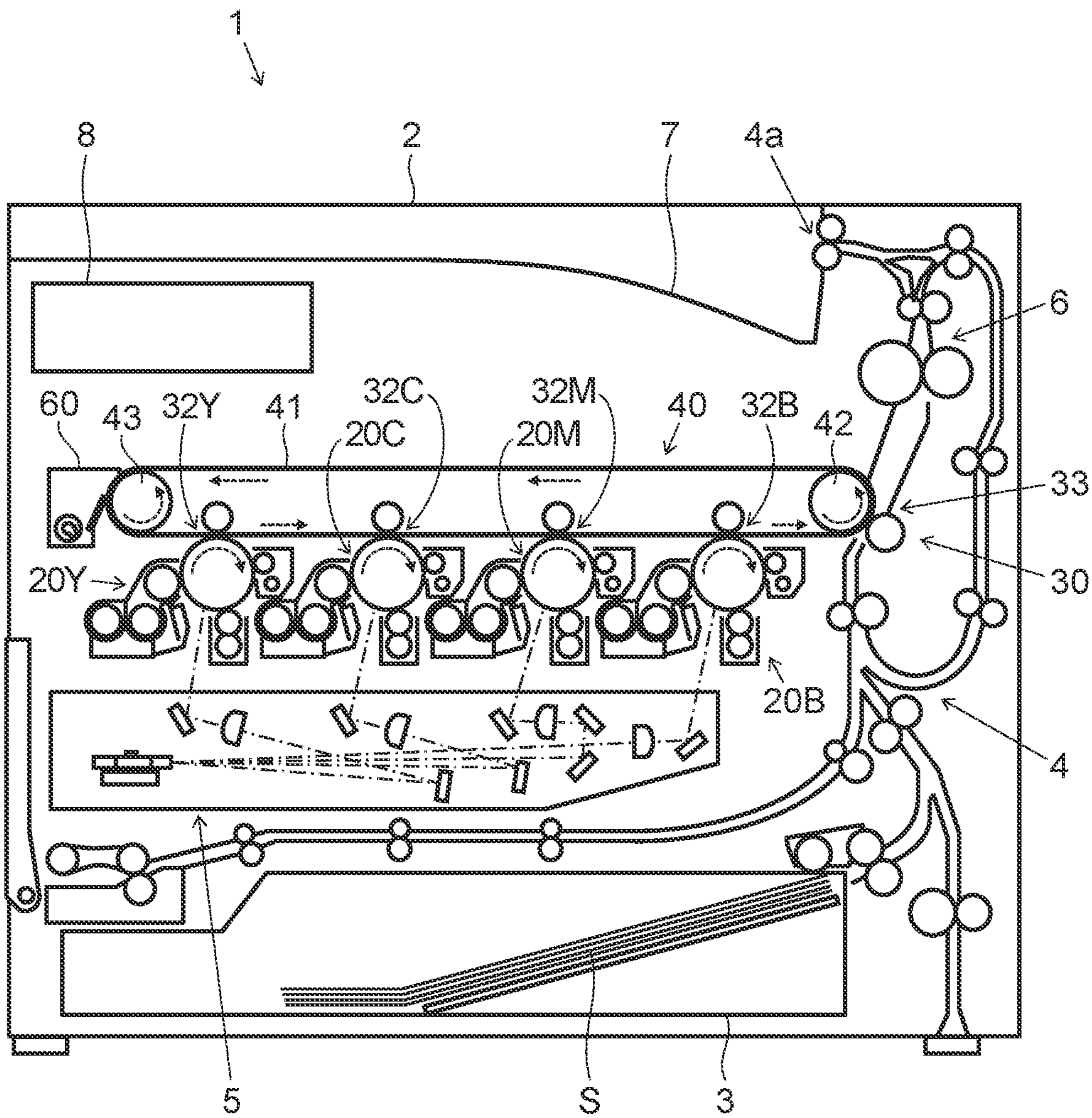
FIG. 1 is a schematic cross-sectional front view of an image forming apparatus of one embodiment of the present disclosure.
Figure 2:
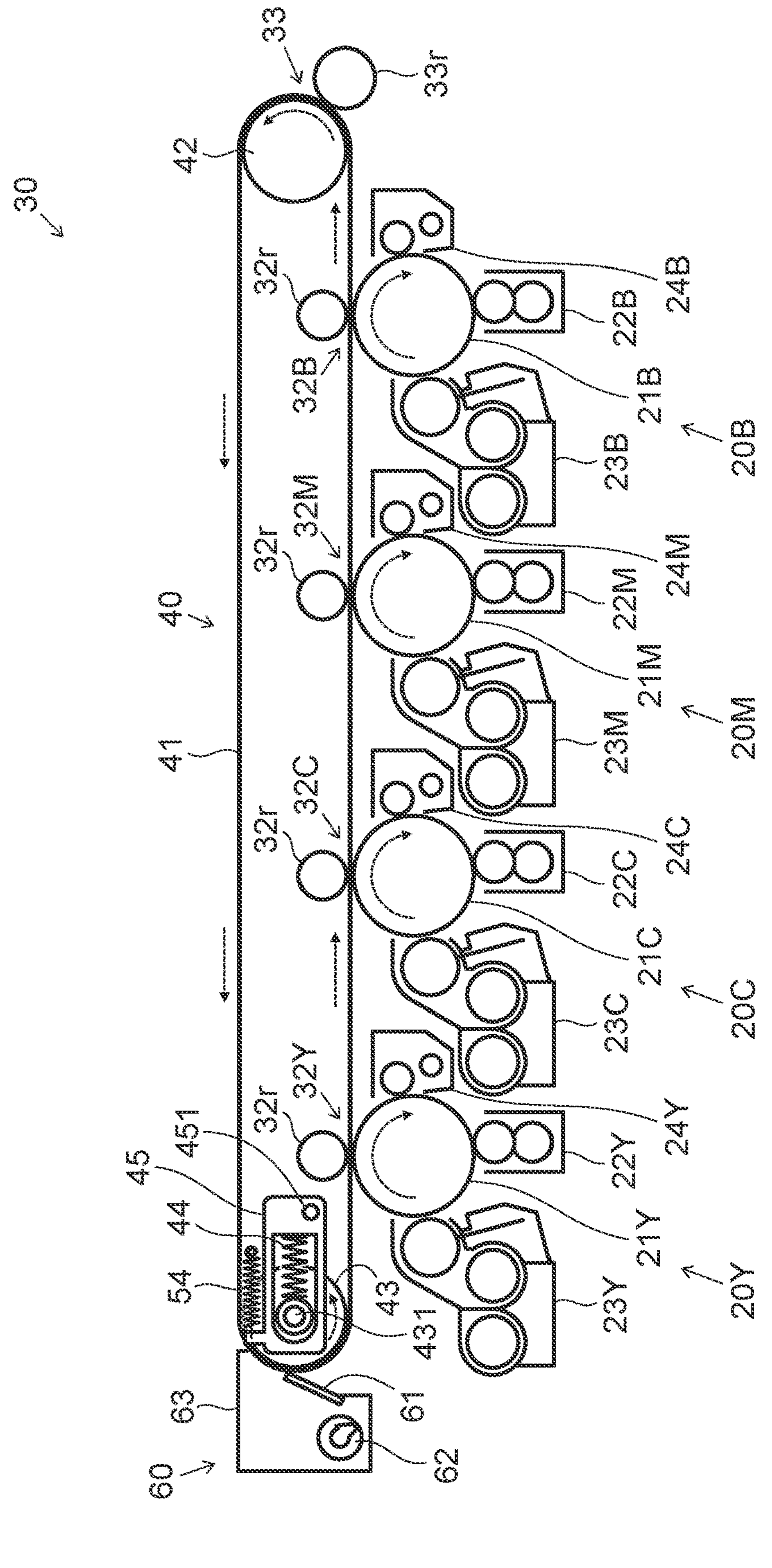
FIG. 2 is a schematic partial cross-sectional view of a belt conveying device of the image forming apparatus illustrated in FIG. 1.

FIG. 1 is a schematic cross-sectional front view of an image forming apparatus 1 of the embodiment. FIG. 2 is a schematic partial cross-sectional view of a belt conveying device of the image forming apparatus 1 illustrated in FIG. 1. An example of the image forming apparatus 1 of this embodiment is a tandem type color printer, which uses an intermediate transfer belt 41 to transfer a toner image onto a paper sheet S. The image forming apparatus 1 may be a so-called multifunction peripheral, which has functions such as printing, scanning (image reading), and facsimile transmission.

As illustrated in FIGS. 1 and 2, the image forming apparatus 1 includes a sheet feed unit 3, a sheet conveying unit 4, an exposing unit 5, an image forming unit 20, a transfer unit 30, a the fixing unit 6, a sheet discharge part 7, and a control unit 8, which are disposed in a main body 2 of the image forming apparatus 1.

The sheet feed unit 3 is disposed in a bottom part of the main body 2. The sheet feed unit 3 stores a plurality of paper sheets S before printing, and separates and feeds the paper sheets S one by one when printing is performed. The sheet conveying unit 4 extends in an up and down direction along a side wall of the main body 2. The sheet conveying unit 4 conveys the paper sheet S fed from the sheet feed unit 3 to a secondary transfer part 33 and fixing unit 6, and further discharges the paper sheet S after fixing onto the sheet discharge part 7 through a sheet discharge outlet **4*a*. The exposing unit 5 is disposed above the sheet feed unit 3. The exposing unit 5 emits a laser beam to the image forming unit 20**, the laser beam being controlled based on image data.

The image forming unit 20 is disposed above the exposing unit 5 and below the intermediate transfer belt 41. The image forming unit 20 includes a yellow image forming unit 20Y, a cyan image forming unit 20C, a magenta image forming unit 20M, and a black image forming unit 20B. These four image forming units 20 have the same basic structure. Therefore, in the following description, the suffix "Y", "C", "M", or "B" indicating the color may be omitted unless it is necessary to specify.

The image forming unit 20 includes a photosensitive drum 21, which is supported in a rotatable manner in a predetermined direction (in a clockwise direction in FIGS. 1 and 2). The image forming unit 20 further includes a charging unit 22, a developing unit 23, and a drum cleaning unit 24, which are disposed around the photosensitive drum 21 along the rotation direction thereof. Note that a primary transfer part 32 is disposed between the developing unit 23 and the drum cleaning unit 24.

The photosensitive drum 21 has a photosensitive layer on its outer circumferential surface. The charging unit 22 charges the outer circumferential surface of the photosensitive drum 21 at a predetermined potential. The exposing unit 5 exposes the outer circumferential surface of the photosensitive drum 21 charged by the charging unit 22, so as to form an electrostatic latent image of an original image on the outer circumferential surface of the photosensitive drum 21. The developing unit 23 supplies toner to the electrostatic latent image for development, so as to form a toner image. The four image forming units 20 form the toner images of different colors, respectively. The drum cleaning unit 24 removes and cleans attached matter such as the toner remaining on the outer circumferential surface of the photosensitive drum 21, after the toner image is primarily transferred onto an outer circumferential surface of the intermediate transfer belt 41. In this way, the image forming unit 20 forms the image (toner image), which is transferred onto the paper sheet S later.

The transfer unit 30 includes a belt conveying device 40, primary transfer parts 32Y, 32C, 32M, and 32B, the secondary transfer part 33, and a belt cleaning unit 60. The belt conveying device 40 is disposed above the four image forming units 20. The belt conveying device 40 includes the intermediate transfer belt 41, which is supported in a rotatable manner in a predetermined direction (in a counterclockwise direction in FIGS. 1 and 2). The intermediate transfer belt 41 is an endless intermediate transfer body to which the toner images are primarily transferred, which have been formed on the outer circumferential surfaces of the photosensitive drums 21 of the four image forming units 20, respectively. The four image forming units 20 are disposed in a line from an upstream side to a downstream side in the rotation direction of the intermediate transfer belt 41, i.e., in a so-called tandem manner.

The primary transfer parts 32Y, 32C, 32M, and 32B are disposed above the image forming units 20Y, 20C, 20M, and 20B of individual colors, respectively, via the intermediate transfer belt 41. The secondary transfer part 33 is disposed on the upstream side of the fixing unit 6 in the paper sheet conveying direction of the sheet conveying unit 4, and on the downstream side of the four image forming units 20Y, 20C, 20M, and 20B in the rotation direction of the intermediate transfer belt 41. The belt cleaning unit 60 is disposed on the upstream side of the four image forming units 20Y, 20C, 20M, and 20B in the rotation direction of the intermediate transfer belt 41.

The primary transfer part 32 transfers the toner image formed on the outer circumferential surface of the photosensitive drum 21 to the intermediate transfer belt 41. In other words, the toner images are primarily transferred to the outer circumferential surface of the intermediate transfer belt 41 at the primary transfer parts 32Y, 32C, 32M, and 32B of individual colors. Further, along with the rotation of the intermediate transfer belt 41, the toner images of the four image forming units 20 are sequentially overlaid and transferred to the intermediate transfer belt 41 at predetermined timings. Thus, a color toner image is formed on the outer circumferential surface of the intermediate transfer belt 41, the color toner image including the overlaid toner images of yellow, cyan, magenta, and black colors.

The color toner image on the outer circumferential surface of the intermediate transfer belt 41 is transferred to the paper sheet S, which is conveyed by the sheet conveying unit 4 in a synchronous manner, at a secondary transfer nip formed at the secondary transfer part 33. The belt cleaning unit 60 removes and cleans attached matter such as the toner remaining on the outer circumferential surface of the intermediate transfer belt 41 after the secondary transfer. In this way, the transfer unit 30 transfers (records) the toner image formed on the outer circumferential surface of the photosensitive drum 21 to the paper sheet S.

The fixing unit 6 is disposed above the secondary transfer part 33. The fixing unit 6 heats and presses the paper sheet S with the transferred toner image so as to fix the toner image to the paper sheet S.

The sheet discharge part 7 is disposed above the transfer unit 30. The paper sheet S after the toner image is fixed and the printing is completed is conveyed to the sheet discharge part 7. The paper sheet after printing (printed matter) is taken out from the top of the sheet discharge part 7.

The control unit 8 includes a CPU, an image processing unit, a storage unit, and other electronic circuits and components (which are not shown). On the basis of control programs and data stored in the storage unit, the CPU controls operations of individual structural elements disposed in the image forming apparatus 1, so as to perform processes of functions of the image forming apparatus 1. The sheet feed unit 3, the sheet conveying unit 4, the exposing unit 5, the image forming unit 20, the transfer unit 30, and the fixing unit 6 individually receive commands from the control unit 8, so as to cooperate for printing on the paper sheet S. For instance, the storage unit is constituted of a combination of a nonvolatile storage device such as a program read only memory (ROM) or data ROM, and a volatile storage device such as a random access memory (RAM).

Next, a structure of the belt conveying device 40 and its vicinity is described with reference to FIG. 2.

As illustrated in FIG. 2, the belt conveying device 40 is disposed above the four image forming units 20Y, 20C, 20M, and 20B, and is disposed along them. The belt conveying device 40 includes the intermediate transfer belt 41, a drive roller 42, a tension roller 43, a pair of tension springs 44, and a pair of roller retaining members 45, which are provided to a in conveyor main body 40A of the belt conveying device 40.

The intermediate transfer belt 41 is an endless belt wrapped around a plurality of rollers in a rotatable manner. The plurality of rollers includes the drive roller 42 and the tension roller 43 in this embodiment. A primary transfer roller 32*r* is disposed above each of the four image forming units 20Y, 20C, 20M, and 20B via the intermediate transfer belt 41. Each of the four primary transfer rollers 32*r* is disposed at a position facing the photosensitive drum 21 via the intermediate transfer belt 41, so as to contact with an inner circumferential surface of the intermediate transfer belt 41.

The drive roller 42 is disposed on the downstream side of the four image forming units 20Y, 20C, 20M, and 20B in the rotation direction of the intermediate transfer belt 41. The drive roller 42 receives a drive force from a drive motor (not shown) so as to rotate the intermediate transfer belt 41 in the counterclockwise direction in FIG. 2.

The drive roller 42 is disposed adjacent to the secondary transfer part 33. A secondary transfer roller 33*r* is disposed at the secondary transfer part 33. The secondary transfer roller 33*r* is disposed at a position facing the drive roller 42 via the intermediate transfer belt 41, so as to contact with the outer circumferential surface of the intermediate transfer belt 41.

The tension roller 43 is disposed on the upstream side of the four image forming units 20Y, 20C, 20M, and 20B in the rotation direction of the intermediate transfer belt 41. The tension roller 43 rotates in the counterclockwise direction in FIG. 2 along with the rotation of the intermediate transfer belt 41. The tension roller 43 is biased by the pair of tension springs 44 in the direction separating from the drive roller 42. In this way, a predetermined tension is applied to the intermediate transfer belt 41.

The pair of tension springs 44 are retained in the pair of roller retaining members 45, respectively. The pair of tension springs 44 are each constituted of a helical compression spring, for example, and are disposed between a shaft 431 of the tension roller 43 and the pair of roller retaining members 45, respectively. The pair of tension springs 44 biases the tension roller 43 in the direction separating from the drive roller 42.

The pair of roller retaining members 45 are respectively disposed on both ends of the tension roller 43 in the axial direction (the direction perpendicular to the paper of FIG. 2). Each of the pair of roller retaining members 45 has a shaft 451, which is disposed closer to the drive roller 42 than the tension roller 43, so as to extend in parallel to the axial direction of the tension roller 43. Each of the pair of roller retaining members 45 is supported by the conveyor main body 40A in a rotatable manner about the axis of the shaft 451.

The pair of roller retaining members 45 are each made of sheet metal, for example, and each extend in the direction perpendicular to the up and down direction (the up and down direction in FIG. 2) and to the axial direction of the tension roller 43 (i.e., extend in the left and right direction in FIG. 2). The pair of roller retaining members 45 each retain the shaft 431 of the tension roller 43 movably in the direction approaching or separating from the drive roller 42. The pair of roller retaining members 45 are respectively biased by a pair of biasing members 54 described later, which are disposed above the pair of roller retaining members 45, in the direction rotating clockwise in FIG. 2 about the axis of the shaft 451, i.e., in the direction that the tension roller 43 side moves upward.

Figure 3:
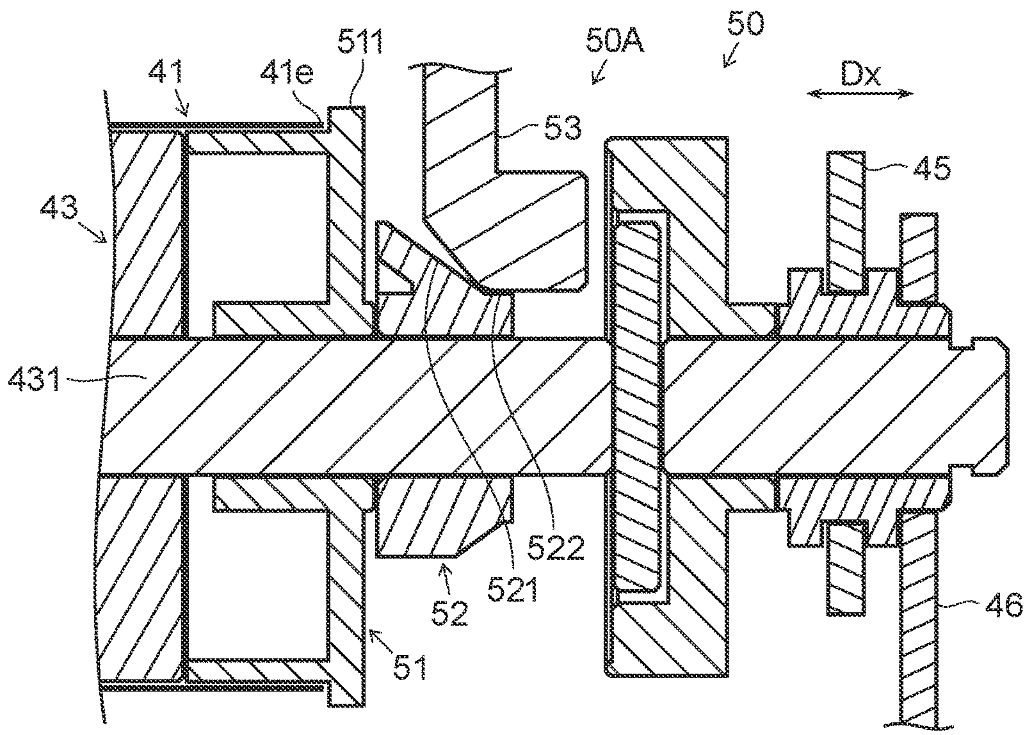
FIG. 3 is a partial side view of a tension roller and its vicinity of the belt conveying device illustrated in FIG. 2.
Figure 4:
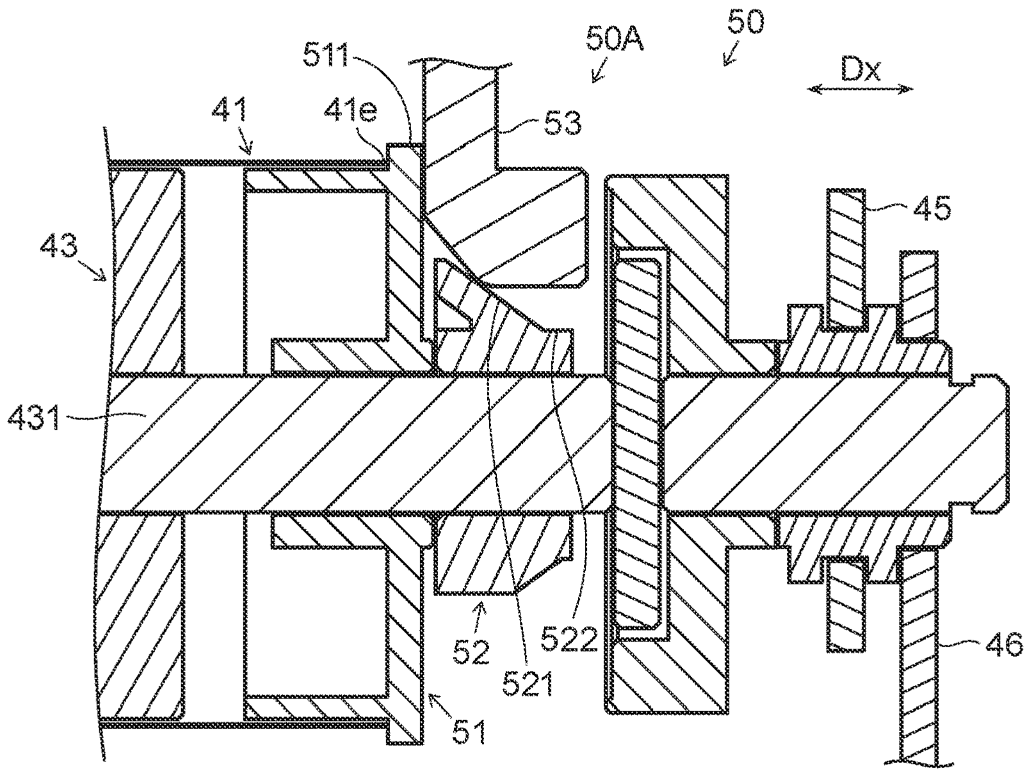
FIG. 4 is a partial side view of the tension roller and its vicinity of FIG. 3, indicating a state where an intermediate transfer belt is meandering.

Next, a structure of the tension roller 43 and its vicinity of the belt conveying device 40 is described with reference to FIGS. 3 and 4. FIG. 3 is a partial cross-sectional view of the tension roller 43 and its vicinity of the belt conveying device 40 illustrated in FIG. 2. FIG. 4 is a partial cross-sectional view of the tension roller 43 and its vicinity illustrated in FIG. 3, indicating a state where the intermediate transfer belt 41 is meandering.

Note that FIGS. 3 and 4 are diagrams of one end and its vicinity of the tension roller 43 in the axial direction Dx, viewed from the direction perpendicular to the axial direction Dx of the tension roller 43. In FIGS. 3 and 4, the left side is the inner side of the tension roller 43 in the axial direction Dx, and the right side is the outer side of the tension roller 43 in the axial direction Dx.

The belt conveying device 40 further includes a correction mechanism 50 illustrated in FIGS. 3 and 4. The correction mechanism 50 is disposed on the shaft 431 of the tension roller 43, and on each side of the tension roller 43 in the axial direction Dx. In other words, in this embodiment, the tension roller 43 is the meandering correction roller, and the correction mechanism 50 is provided to the tension roller 43. The correction mechanism 50 corrects meandering of the intermediate transfer belt 41 with respect to the tension roller 43.

Figure 6:
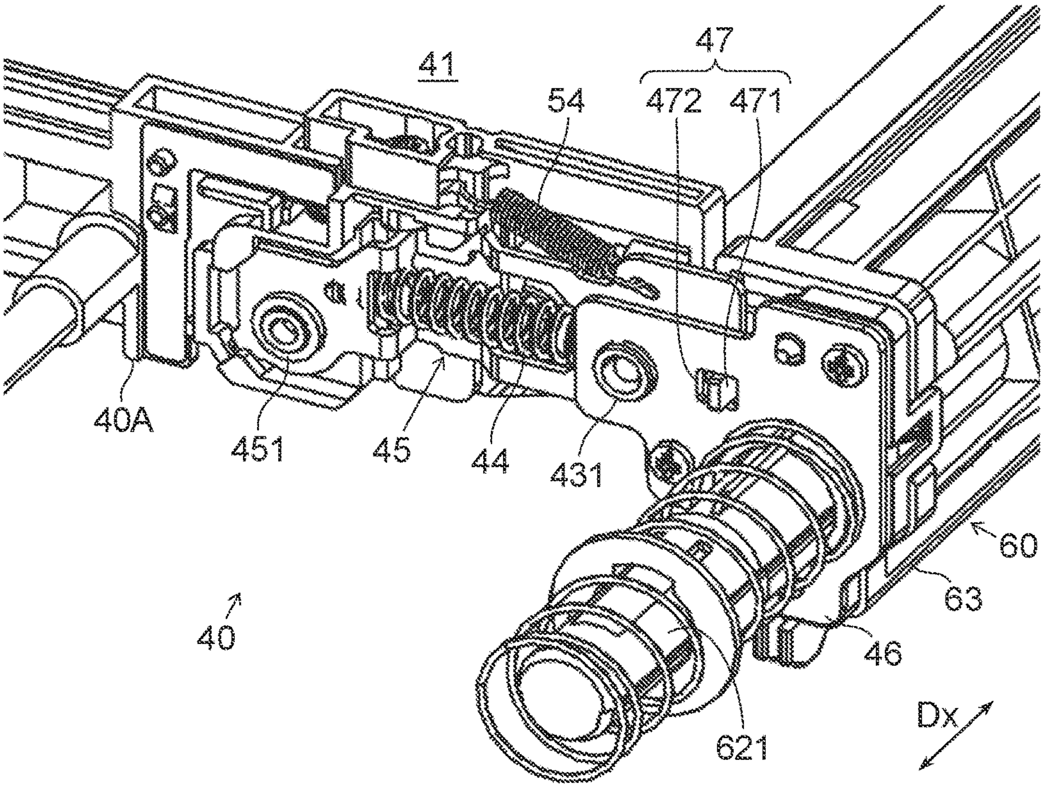
FIG. 6 is an enlarged partial perspective view of the belt conveying device illustrated in FIG. 5.
Figure 8:
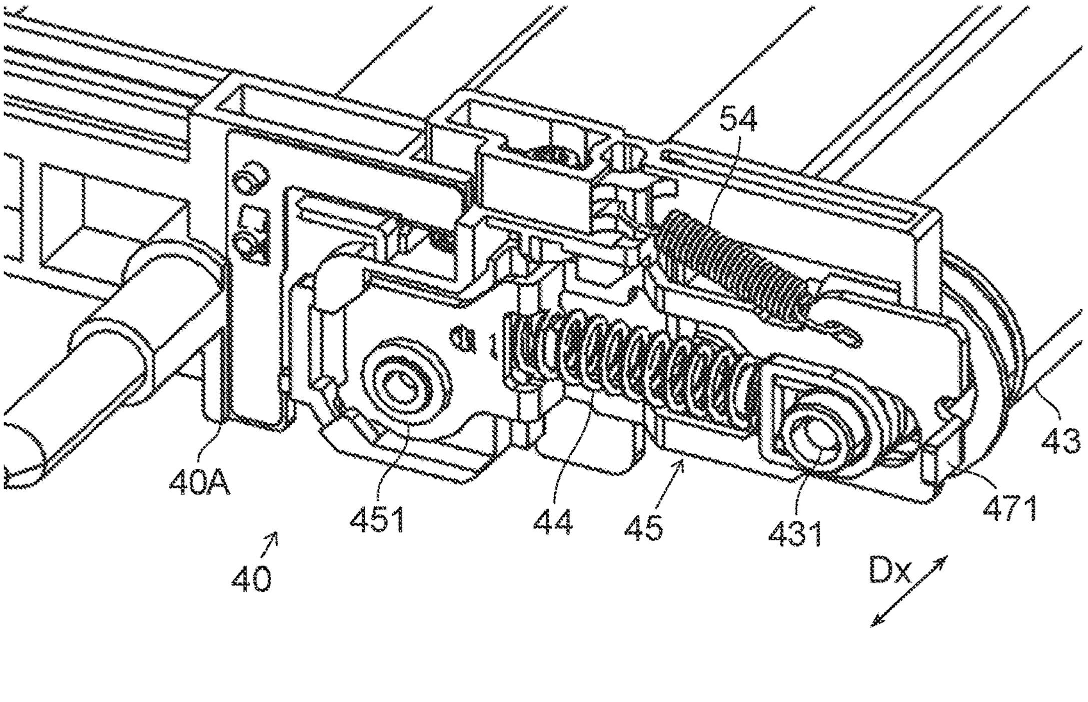
FIG. 8 is an enlarged partial perspective view of the belt conveying device illustrated in FIG. 7.

The correction mechanism 50 includes a pair of belt guides 51, a moving mechanism 50A, and the pair of biasing members 54 (see FIGS. 2, 6, and 8). The moving mechanism 50A includes a pair of tilt bearings 52, and a pair of main body guides 53.

The pair of belt guides 51 are respectively disposed at both ends of the tension roller 43 in the axial direction Dx. The pair of belt guides 51 are respectively disposed inside the pair of tilt bearings 52 and outside the intermediate transfer belt 41 in the axial direction Dx of the tension roller 43. The pair of belt guides 51 are each a circular ring member extending radially from the center that is the axis of the tension roller 43. The shaft 431 of the tension roller 43 penetrates the radial centers of the pair of belt guides 51 in the axial direction Dx. The pair of belt guides 51 can move in the axial direction Dx of the tension roller 43. The pair of belt guides 51 have a pair of guide walls 511, respectively.

The pair of guide walls 511 are disposed at radial outer edges of the pair of belt guides 51, respectively, so as to protrude outward in the radial direction and to extend annularly in the circumferential direction. The pair of guide walls 511 are disposed at positions facing each other so as to sandwich the intermediate transfer belt 41 in the axial direction Dx of the tension roller 43. The pair of guide walls 511 respectively face and contact with side end edges 41*e* of the intermediate transfer belt 41 in the axial direction Dx of the tension roller 43.

The pair of tilt bearings 52 are respectively disposed outside of the pair of belt guides 51 in the axial direction Dx of the tension roller 43. The pair of tilt bearings 52 support the shaft 431 of the tension roller 43 in a rotatable manner about the axis thereof. The pair of tilt bearings 52 can move in the axial direction Dx of the tension roller 43.

The pair of tilt bearings 52 respectively have a pair of tilted parts 521 and a pair of parallel parts 522. In other words, each of the pair of tilt bearings 52 has the tilted part 521 and the parallel part 522.

The pair of tilted parts 521 are respectively formed continuously to the pair of parallel parts 522, at insides of the pair of parallel parts 522 in the axial direction Dx of the tension roller 43. The pair of tilted parts 521 are positioned on the upper side of the shaft 431 of the tension roller 43, and respectively face the pair of main body guides 53 in the up and down direction.

The outer surfaces of the pair of tilted parts 521 are tilted from the axial direction Dx of the tension roller 43. In detail, the tilted part 521 is tilted outward from the radial center of the tension roller 43 (upward in FIGS. 3 and 4), from outside to inside in the axial direction Dx of the tension roller 43 (from right side to left side in FIGS. 3 and 4). The pair of tilted parts 521 are tilted symmetrically with respect to the center in the axial direction Dx of the tension roller 43.

The pair of parallel parts 522 are respectively formed continuously to the pair of tilted parts 521, at outsides of the pair of tilted parts 521 in the axial direction Dx of the tension roller 43. The outer surfaces of the pair of parallel parts 522 extends in parallel to the axial direction Dx of the tension roller 43.

The pair of main body guides 53 are disposed at positions facing the pair of tilted parts 521, respectively, and are fixed to the main body 2. The pair of main body guides 53 are constituted of a pair of plate-like members, for example, and are disposed on the upper side of the tilt bearing 52, so as to extend in the direction perpendicular to the up and down direction (the up and down direction in FIGS. 3 and 4) and to the axial direction Dx of the tension roller 43 (i.e., extend in the direction perpendicular to the paper of FIGS. 3 and 4). The pair of main body guides 53 respectively face and contact with the pair of tilt bearings 52 in the up and down direction and in the axial direction Dx.

The pair of biasing members 54 (see FIGS. 2, 6, and 8) are disposed above the pair of roller retaining members 45, respectively. The biasing members 54 are each constituted of a helical extension spring, for example, and are disposed between the conveyor main body 40A and the pair of roller retaining members 45, respectively.

The pair of biasing members 54 respectively bias the pair of roller retaining members 45 in the direction rotating about the axis of the shaft 451 in the clockwise direction in FIG. 2. Thus, the pair of biasing members 54 bias the shaft 431 of the tension roller 43 upward via the pair of roller retaining members 45, respectively. In other words, the pair of biasing members 54 bias the pair of tilt bearings 52 toward the pair of main body guides 53, so that the pair of tilt bearings 52 maintain contacts with the pair of main body guides 53, respectively.

As illustrated in FIG. 3, when the pair of biasing members 54 bias the shaft 431 of the tension roller 43 upward, the pair of tilt bearings 52 are pressed to the pair of main body guides 53, respectively. The pair of main body guides 53 contact with the pair of parallel parts 522 of the pair of tilt bearings 52, respectively. When the intermediate transfer belt 41 normally rotates without meandering, the shaft 431 of the tension roller 43 is substantially horizontal. During the normal rotation of the intermediate transfer belt 41, the state illustrated in FIG. 3 is maintained.

As illustrated in FIG. 4, when the intermediate transfer belt 41 is meandering, the intermediate transfer belt 41 contacts with the guide wall 511 of one of the belt guides 51, and push the belt guide 51 outward in the axial direction Dx (to the right side in FIG. 4). The belt guide 51 moves outward in the axial direction Dx (to the right side in FIG. 4). Then, the belt guide 51 pushes the tilt bearing 52, which is disposed adjacent to face the belt guide 51 in the axial direction Dx, outward in the axial direction Dx (to the right side in FIG. 4). The tilt bearing 52 moves outward in the axial direction Dx (to the right side in FIG. 4).

In this way, the main body guide 53 contacting with the parallel part 522 of the tilt bearing 52 slides on the outer surface of the parallel part 522, and contacts the tilted part 521 of the tilt bearing 52. In other words, when the intermediate transfer belt 41 is meandering, the main body guide 53 contacts the tilted part 521 of the tilt bearing 52 that moves in the axial direction Dx of the tension roller 43.

Furthermore, when the tilt bearing 52 moves outward in the axial direction Dx (to the right side in FIG. 4), the main body guide 53 slides on the slope of the tilted part 521, and one end side of the tension roller 43 in the axial direction Dx (the right side in FIG. 4) moves downward. Thus, when the intermediate transfer belt 41 is meandering, the moving mechanism 50A (the tilt bearing 52 and the main body guide 53) allows the one end side of the tension roller 43 in the axial direction Dx to move in the direction perpendicular to the axial direction Dx. In other words, when the intermediate transfer belt 41 is meandering, the main body guide 53 moves the one end side of the tension roller 43 in the axial direction Dx, together with the tilt bearing 52 that moves in the axial direction Dx of the tension roller 43, in the direction perpendicular to the axial direction Dx.

Then, the entire tension roller 43 is inclined, and the meandering of the intermediate transfer belt 41 is stopped. In this way, the intermediate transfer belt 41 continues to rotate stably. Thus, the correction mechanism 50 corrects meandering of the intermediate transfer belt 41 with respect to the tension roller 43.

Figure 5:
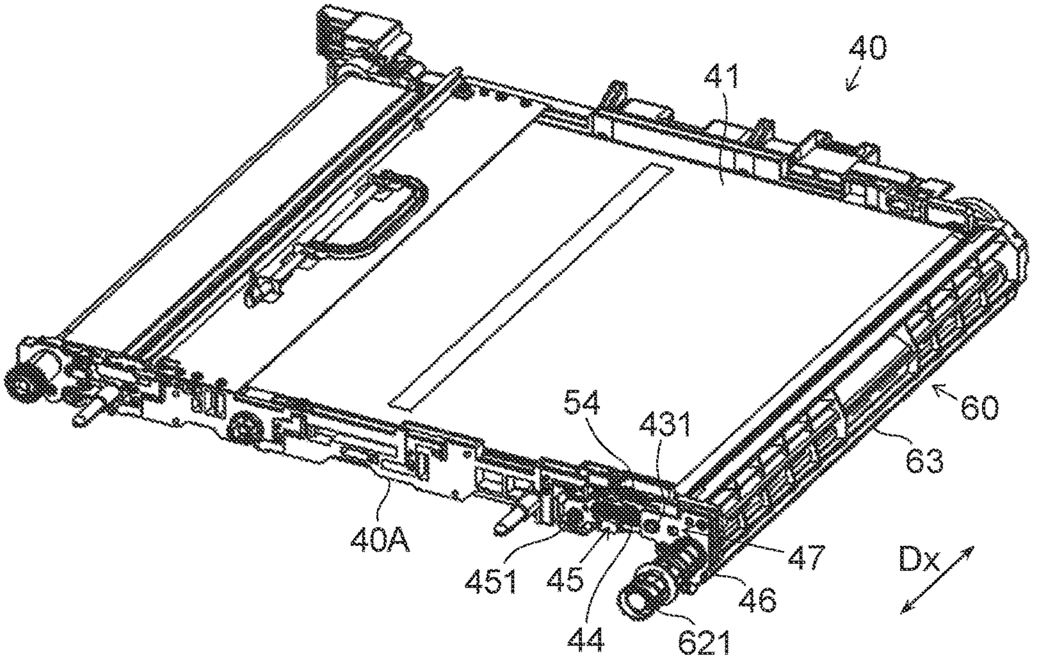
FIG. 5 is a perspective view of the belt conveying device illustrated in FIG. 2.
Figure 7:
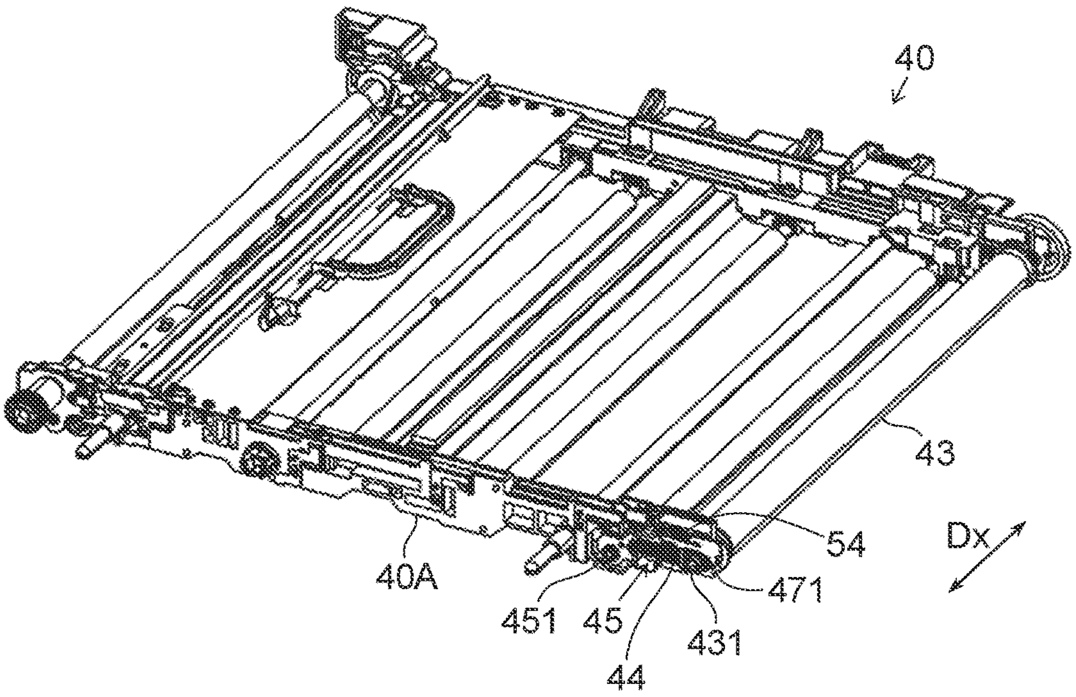
FIG. 7 is a perspective view of the belt conveying device illustrated in FIG. 2, in the state where the intermediate transfer belt and the belt cleaning unit are removed.

Next, a structure of the belt cleaning unit 60 and its vicinity is described with reference to FIGS. 2, 5, 6, 7, and 8. FIGS. 5 and 6 are respectively a perspective view and an enlarged partial perspective view of the belt conveying device 40 illustrated in FIG. 2. FIGS. 7 and 8 are respectively a perspective view and an enlarged partial perspective view, indicating the state where the intermediate transfer belt 41 and the belt cleaning unit 60 are removed in the belt conveying device 40 illustrated in FIG. 2. Note that FIGS. 5, 6, 7, and 8 are diagrams of the belt conveying device 40 viewed from the back side.

The belt conveying device 40 further includes the belt cleaning unit 60, a cleaning support member 46, and a posture maintaining unit 47, which are illustrated in FIGS. 2, 5, 6, 7, and 8.

The belt cleaning unit 60 is disposed at a position facing the tension roller 43 via the intermediate transfer belt 41. As illustrated in FIG. 2, the belt cleaning unit 60 includes a cleaning blade 61, a collecting screw 62, and a housing 63.

The cleaning blade 61 is disposed in an upper part of the housing 63. The cleaning blade 61 is fixed to the housing 63 so that its tip contacts with the outer circumferential surface of the intermediate transfer belt 41. The cleaning blade 61 extends in the axial direction Dx of the tension roller 43 (the direction perpendicular to the paper of FIG. 2), and contacts with the intermediate transfer belt 41 over the entire range in the axial direction Dx. The cleaning blade 61 is disposed tilted at a predetermined angle with respect to the outer circumferential surface of the intermediate transfer belt 41, and its tip is directed to the upstream side in the rotation direction of the intermediate transfer belt 41.

The cleaning blade 61 is made of polyurethane rubber, for example, and an intrusion of the cleaning blade 61 into the intermediate transfer belt 41 is set to a predetermined value. Note that material, hardness, size of the cleaning blade 61, contact pressure thereof on the intermediate transfer belt 41, and the like are preferably set to any values in accordance with specification of the intermediate transfer belt 41. The cleaning blade 61 removes attached matter such as toner remaining on the outer circumferential surface of the intermediate transfer belt 41. The attached matter of the intermediate transfer belt 41 removed by the cleaning blade 61 is collected through an opening of the housing 63, which is disposed on the upstream side of the cleaning blade 61 in the rotation direction of the intermediate transfer belt 41, into the housing 63.

The collecting screw 62 is disposed in a lower part of the housing 63. The collecting screw 62 has a structure including a shaft extending in the axial direction Dx of the tension roller 43, and a helical conveying blade extending in the axial direction on the outer circumferential surface of the shaft. The collecting screw 62 is supported by the housing 63 in a rotatable manner about the axis of the collecting screw 62. The collecting screw 62 is disposed partially inside the housing 63. As illustrated in FIGS. 5 and 6, an attached matter discharge unit 621 is disposed at one end of the collecting screw 62 in the axial direction and protrudes outside the housing 63.

The collecting screw 62 conveys the attached matter of the intermediate transfer belt 41, which has been collected into the housing 63, to the attached matter discharge unit 621 in the axial direction Dx of the tension roller 43. The attached matter of the intermediate transfer belt 41 conveyed by the collecting screw 62 is discharged from the attached matter discharge unit 621 to the outside of the housing 63, and is further conveyed to a recovery container (not shown) for storage, which is disposed outside the housing 63.

The housing 63 has a box shape extending in the axial direction Dx of the tension roller 43 over substantially the entire range of the intermediate transfer belt 41. The housing 63 supports the cleaning blade 61 and the collecting screw 62. The housing 63 stores the attached matter of the intermediate transfer belt 41 removed by the cleaning blade 61.

As illustrated in FIGS. 5 and 6, the cleaning support member 46 is fixed to each end of the tension roller 43 in the axial direction Dx, outside the housing 63 of the belt cleaning unit 60. The cleaning support member 46 is disposed adjacent to the roller retaining member 45 outside the roller retaining member 45 in the axial direction Dx.

The cleaning support member 46 is made of sheet metal, for example, and extends in the direction perpendicular to the up and down direction and to the axial direction Dx of the tension roller 43. The shaft 431 of the tension roller 43 penetrates the cleaning support member 46 at one end part. In other words, the cleaning support member 46 is attached to the shaft 431 of the tension roller 43, so as to support the belt cleaning unit 60.

As illustrated in FIGS. 5, 6, 7, and 8, the posture maintaining unit 47 is provided to the roller retaining member 45 and the cleaning support member 46. In detail, the posture maintaining unit 47 is disposed at the part where the roller retaining member 45 and the cleaning support member 46 overlap in the axial direction Dx of the tension roller 43.

The posture maintaining unit 47 is formed on each of the roller retaining member 45 and the cleaning support member 46, as a mechanism connecting the roller retaining member 45 and the cleaning support member 46. In this way, the cleaning support member 46 cannot rotate about the axis of the shaft 431 of the tension roller 43 with respect to the roller retaining member 45. In other words, the posture maintaining unit 47 connects the roller retaining member 45 and the cleaning support member 46, so as to maintain posture of the belt cleaning unit 60 with respect to the tension roller 43.

According to the structure described above, the posture maintaining unit 47 that maintains posture of the belt cleaning unit 60 is formed as a connecting section between the roller retaining member 45 and the cleaning support member 46, and it is not disposed outside the intermediate transfer belt 41 in the radial direction. In other words, the posture maintaining unit 47 can be constituted without adding other members and without disposing it outside the intermediate transfer belt 41 in the radial direction or in the axial direction. Therefore, with a small sized structure in which an increase in the number of component members is suppressed, cleaning performance of the intermediate transfer belt 41 can be stabilized, and meandering of the intermediate transfer belt 41 can be stopped.

In addition, the posture maintaining unit 47 includes a protrusion 471 and an aperture 472.

The protrusion 471 is provided to the roller retaining member 45. The protrusion 471 protrudes outward in the axial direction Dx of the tension roller 43. In other words, the protrusion 471 protrudes toward the cleaning support member 46 in the axial direction Dx.

The aperture 472 is provided to the cleaning support member 46. The aperture 472 penetrates the cleaning support member 46 in the axial direction Dx of the tension roller 43. The protrusion 471 is inserted in the aperture 472. In this way, the roller retaining member 45 and the cleaning support member 46 are connected to each other.

According to the structure described above, the structure for connecting the roller retaining member 45 and the cleaning support member 46 can be easily formed. In other words, with the simple structure, the roller retaining member 45 and the cleaning support member 46 can be connected to each other, so that posture of the belt cleaning unit 60 can be maintained.

Note that a protrusion may be provided to the cleaning support member 46 while an aperture may be provided to the roller retaining member 45, so that the roller retaining member 45 and the cleaning support member 46 are connected to each other.

In addition, the protrusion 471 is formed by bending a part of roller retaining member 45 that is a plate-like member. In detail, the protrusion 471 is formed by bending a part of the roller retaining member 45 protruding outward in the radial direction of the tension roller 43, toward the cleaning support member 46, i.e., outward in the axial direction Dx.

According to the structure described above, the protrusion 471 can be formed easily only by bending a part of the roller retaining member 45. In other words, the roller retaining member 45 and the cleaning support member 46 can be connected to each other with the simple structure, and posture of the belt cleaning unit 60 can be maintained.

In addition, as described above, the moving mechanism 50A includes the pair of tilt bearings 52 and the pair of main body guides 53. The correction mechanism 50 further includes the pair of biasing members 54. At the tension roller 43, a tension is applied to the intermediate transfer belt 41, and hence the intermediate transfer belt 41 tends to meander. Therefore, by providing the tension roller 43 with the correction mechanism 50 that is an alignment adjusting mechanism, performance of stopping meandering of the intermediate transfer belt 41 can be improved.

In addition, as the structure described above, the image forming apparatus 1, which has a small sized structure in which an increase in the number of component members is suppressed by providing the belt conveying device 40, can stabilize cleaning performance of the intermediate transfer belt 41 and can stop meandering of the intermediate transfer belt 41. In this way, the image forming apparatus 1 can continue to form high quality images.

Although the embodiment of the present disclosure is described above, the scope of the present disclosure is not limited to the above description, but can be variously modified for implementation within the scope of the disclosure without deviating from the spirit thereof.

For instance, in the embodiment described above, the belt conveying device 40 includes the intermediate transfer belt 41 on which toner images formed by the four image forming units 20 are sequentially overlaid and transferred, but the present disclosure is not limited to this structure. The present disclosure can also be applied to a belt conveying device including a conveyor belt that conveys a recording medium on which an image is recorded by an image forming unit, for example.

In addition, in the embodiment described above, the image forming apparatus 1 is a so-called tandem type image forming apparatus for color printing, but it is not limited to this type. The image forming apparatus may be any type of image forming apparatus for color printing other than the tandem type, as long as it includes an intermediate transfer belt.

What is claimed is:

1. A belt conveying device comprising:

an endless belt;

a plurality of rollers around which the belt is wrapped in a rotatable manner;

a correction mechanism including a pair of belt guides, a moving mechanism, and a pair of biasing members, the correction mechanism correcting meandering of the belt with respect to the roller; and a belt cleaning unit including a cleaning blade, a collecting screw, and a housing the belt cleaning unit removing attached matter on an outer circumferential surface of the belt, wherein the correction mechanism is provided to a meandering correction roller that is one of the plurality of rollers, and includes a moving mechanism including a pair of tilt bearings and a pair of main body guides, the moving mechanism allowing one end side of the meandering correction roller in an axial direction to move in a direction perpendicular to the axial direction when the belt is meandering, and wherein the belt conveying device further comprises a roller retaining member that extends in a direction perpendicular to an up and down direction and to the axial direction of the meandering correction roller and that retains a shaft of the meandering correction roller, a cleaning support member that extends in the direction perpendicular to the up and down direction and to the axial direction of the meandering correction roller and that is attached to the shaft of the meandering correction roller so as to support the belt cleaning unit, and a posture maintaining unit that connects the roller retaining member and the cleaning support member, so as to maintain a posture of the belt cleaning unit with respect to the meandering correction roller, and the posture maintaining unit includes a protrusion provided to one of the roller retaining member and the cleaning support member, and an aperture provided to the other so that the protrusion is inserted in the aperture.

2. The belt conveying device according to claim 1, wherein the protrusion is formed by bending a part of the roller retaining member or the cleaning support member, which is made of a plate-like member.

3. The belt conveying device according to claim 1, wherein the moving mechanism includes a pair of tilt bearings having a pair of tilted parts tilted symmetrically in the axial direction of the meandering correction roller, the tilt bearings supporting the shaft of the meandering correction roller in a rotatable manner, and being movable in the axial direction of the meandering correction roller, and a pair of main body guides, which contact with the pair of tilted parts, and allow one end side of the meandering correction roller in the axial direction to move in the direction perpendicular to the axial direction, together with the pair of tilt bearings that move in the axial direction of the meandering correction roller, when the belt is meandering, and the correction mechanism further includes a pair of biasing members that bias the pair of tilt bearings toward the pair of main body guides, respectively, so that the pair of tilt bearings maintain contacts with the pair of main body guides, respectively.

4. An image forming apparatus comprising:

a plurality of image forming units; and the belt conveying device according to claim 1, which is disposed adjacent to the image forming units, wherein the belt is an intermediate transfer belt on which toner images formed by the image forming units are sequentially overlaid and transferred.

* * * * *